US009099693B2

(12) United States Patent
Nakaji et al.

(10) Patent No.: US 9,099,693 B2
(45) Date of Patent: Aug. 4, 2015

(54) FUEL CELL AND FUEL CELL SEPARATOR (75) Inventors: Hiroya Nakaji, Toyota (JP); Tsutomu Ochi, Aichi (JP); Chisato Kato, Aichi (JP); Tsunemasa Nishida, Toyota (JP); Manabu Takahashi, Toyota (JP); Yasuyuki Asai, Toyota (JP)

(73) Assignee: TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 1270 days.

(21) Appl. No.: 11/886,292

(22) PCT Filed: Mar. 23, 2006

(86) PCT No.: PCT/JP2006/306590
§ 371 (c)(1),
(2), (4) Date: Sep. 14, 2007

(87) PCT Pub. No.: WO2006/101260
PCT Pub. Date: Sep. 28, 2006

(65) Prior Publication Data
US 2008/0166608 A1 Jul. 10, 2008

(30) Foreign Application Priority Data
Mar. 23, 2005 (JP) ................................. 2005-084435

(51) Int. Cl.
*H01M 8/04* (2006.01)
*H01M 8/02* (2006.01)
*H01M 8/10* (2006.01)

(52) U.S. Cl.
CPC .......... *H01M 8/0267* (2013.01); *H01M 8/0258* (2013.01); *H01M 8/0228* (2013.01); *H01M 8/0276* (2013.01); *H01M 2008/1095* (2013.01); *Y02E 60/50* (2013.01)

(58) Field of Classification Search
USPC .................................................. 429/437, 508
See application file for complete search history.

(56) References Cited

U.S. PATENT DOCUMENTS

| 5,230,966 | A | 7/1993 | Voss et al. |
| 6,893,765 | B1* | 5/2005 | Nishida et al. ................ 429/481 |
| 7,195,837 | B2 | 3/2007 | Suzuki et al. |
| 2003/0072986 | A1* | 4/2003 | Kusakabe et al. ............... 429/34 |
| 2003/0087140 | A1* | 5/2003 | Kikuchi et al. .................. 429/26 |
| 2003/0087142 | A1* | 5/2003 | Kobayashi et al. ............. 429/30 |
| 2003/0129475 | A1 | 7/2003 | Enjoji et al. |
| 2003/0211376 | A1 | 11/2003 | Hatoh et al. |
| 2004/0048126 | A1 | 3/2004 | Shibata et al. |
| 2004/0131905 | A1 | 7/2004 | Enjoji et al. |

(Continued)

FOREIGN PATENT DOCUMENTS

| CA | 2 401 934 A1 | 3/2003 |
| DE | 103 00 068 A1 | 8/2003 |

(Continued)

*Primary Examiner* — Patrick Ryan
*Assistant Examiner* — Jose Colucci Rios
(74) *Attorney, Agent, or Firm* — Kenyon & Kenyon LLP (57) ABSTRACT In a fuel cell having a separator in which main cooling water channels are formed, a separator for another unit cell stacked on the cooling water channel formation surface side of the separator, and a second sealing member interposed between the separators and to seal a cooling medium flowing in the main cooling water channels, an outer peripheral rib for regulating the flow of cooling water to the second sealing member side is provided inside relative to the second sealing member in the separator surface direction in order to improve the efficiency of cooling with the cooling medium.

16 Claims, 4 Drawing Sheets

(56) References Cited

U.S. PATENT DOCUMENTS

| | | | |
|---|---|---|---|
| 2004/0209148 A1* | 10/2004 | Ohara et al. | 429/35 |
| 2006/0127735 A1* | 6/2006 | Sabin et al. | 429/35 |
| 2007/0015019 A1 | 1/2007 | Baschek et al. | |

FOREIGN PATENT DOCUMENTS

| | | |
|---|---|---|
| DE | 10303655 A1 | 8/2003 |
| DE | 102004021253 A1 | 11/2004 |
| DE | 103 23 882 A1 | 12/2004 |
| DE | 103 21 916 B4 | 6/2006 |
| JP | 8-306371 A | 11/1996 |
| JP | 9-289029 A | 11/1997 |
| JP | 2000-228207 A | 8/2000 |
| JP | 2000-231929 A | 8/2000 |
| JP | 2001-110434 A | 4/2001 |
| JP | 2002-231274 A | 8/2002 |
| JP | 2003-157866 A | 5/2003 |
| JP | 2004-158217 A | 6/2004 |
| JP | 2004-213972 A | 7/2004 |

* cited by examiner

FUEL CELL AND FUEL CELL SEPARATOR

This is a 371 national phase application of PCT/JP2006/306590 filed 23, Mar. 2006, claiming priority to Japanese Patent Application No. 2005-084435filed 23 Mar. 2005, the contents of which are incorporated herein by reference.

BACKGROUND

The present invention relates to a fuel cell and a fuel cell separator and, more particularly, to a technique effective in improving the efficiency of cooling of a fuel cell by means of a cooling medium.

For example, a solid polymer electrolyte type of fuel cell is constructed by stacking cells each formed of a membrane-electrode assembly (MEA) and separators. The MEA is constituted by an electrolyte membrane formed of an ion-exchange membrane, an electrode (anode) formed of a catalyst layer placed on one surface of the electrolyte membrane, and an electrode (cathode) formed of a catalyst layer placed on the other surface of the electrolyte membrane.

Figure 5:
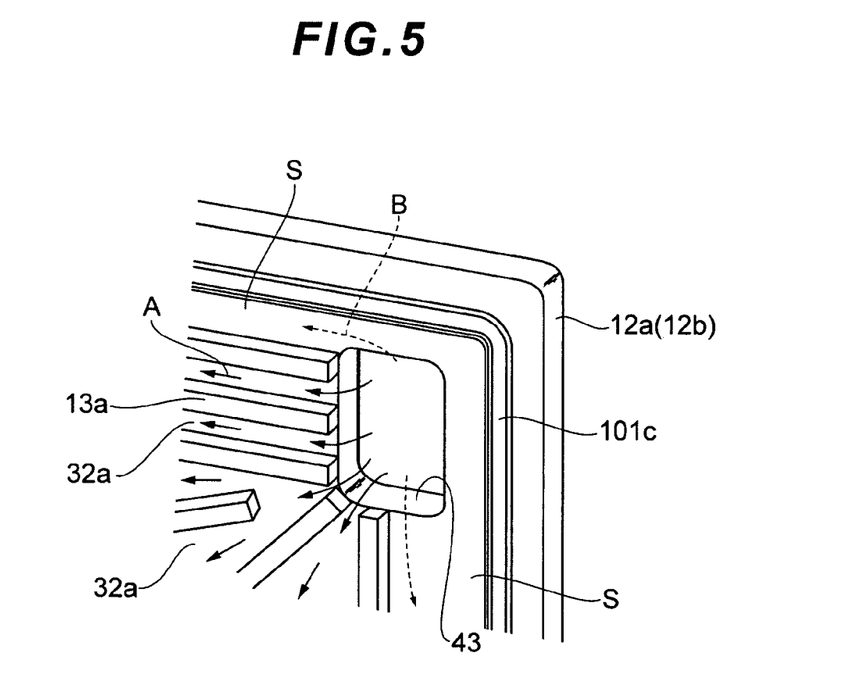
FIG. 5 is a perspective view showing a portion of a conventional fuel cell separator.
Figure 6:
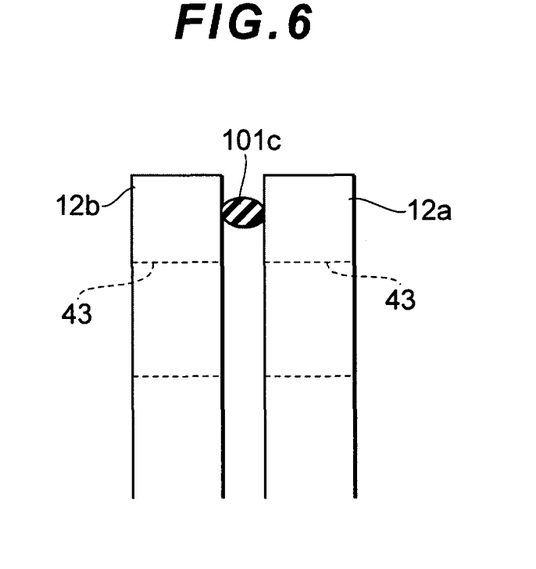
FIG. 6 is a partial sectional view showing a stacked state of the conventional fuel cell separator.
Figure 7:
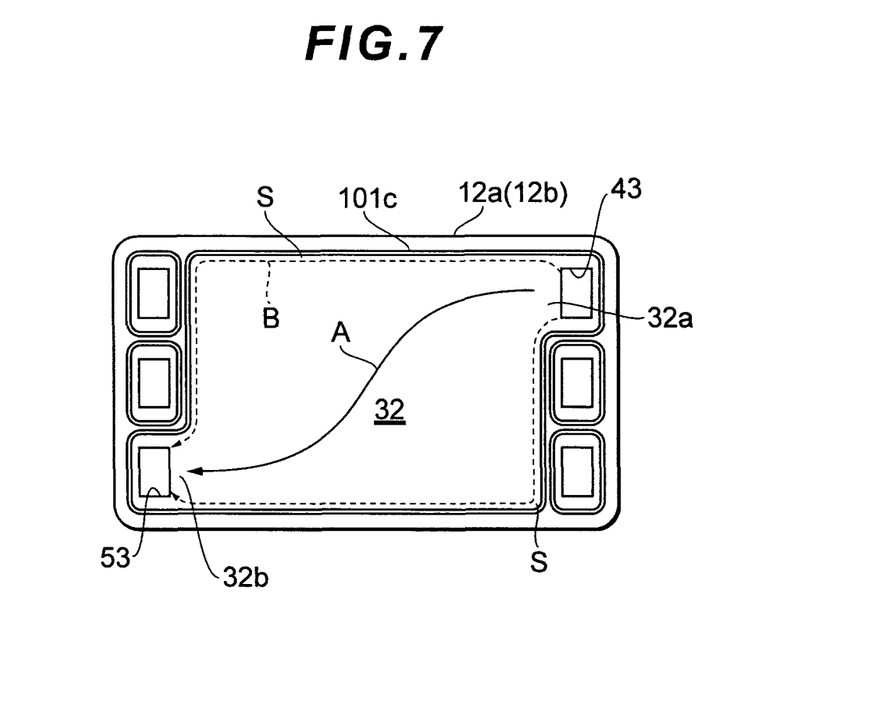
FIG. 7 is a plan view of the conventional fuel cell separator showing the flow of cooling water.

FIGS. 5 to 7 show separators 12a and 12b between which the MEA is sandwiched. Manifolds 43 and 53 for supplying and discharging cooling water are formed as rectangular openings through end portions of the separators 12a and 12b. Portions facing the electrodes of the MEA are formed, for example, by pressing to form a plurality of projecting ribs 13a in the front and back surfaces. Cooling water inflow channels 32a, main cooling water channels 32 and cooling water outflow channels 32b are formed between the ribs 13a.

A plurality of unit cells constructed by sandwiching the MEA not shown in the figures between the separators 12a and 12b are stacked to construct a fuel cell stack. At this time, the main cooling water channels 32 and the cooling water inflow channels 32a and the cooling water outflow channels 32b communicating with the inlet and outlet sides of the main cooling water channels 32 are defined between one unit cell separator 12a and the other unit cell separator 12b in the adjacent pair of separators. Cooling water flowing in these channels 32a, 32, and 32b are sealed with a sealing member (gasket) 101c interposed between the two separators 12a and 12b, as shown in FIG. 6, and as disclosed in Japanese Patent Laid-Open Nos. 2002-231274 and 2003-157866.

During power generation from the fuel cell, cooling water supplied from the inlet-side manifold 43 flows through the channels 32a, 32, and 32b as indicated by arrow A, in FIGS. 5 and 7. The cooling water cools the portion (area) corresponding to the power generation region of the MEA (the region facing the electrodes of the MEA) and thereafter flows into the outlet-side manifold 53 to be discharged.

SUMMARY

In the thus-constructed fuel cell, there is a need to provide spaces for attachment of the sealing member 101c on peripheral portions of the separators 12a and 12b. That is, the sealing member 101c is fixed at positions set apart from the manifolds 43 and 53 to an outer peripheral side of the separator by anticipating in advance the amount of compression in the separator surface direction in the compressed state in addition to a placement space in the uncompressed state.

Therefore, a redundant space S is produced between the manifolds 43 and 53 and an inner line of the sealing member 101c, and part of the cooling water flowing round into this space flows along the sealing member 101c as indicated by arrow B in FIGS. 5 and 7. The region along arrow B, i.e., the portion (area) not corresponding to the generation region of the MEA, does not face the power generation region in which heat is generated and does not need cooling. There was, therefore, a problem that cooling water flows round into this region to cause a reduction in cooling efficiency.

The present invention has been achieved in consideration of the above-described circumstances, and an object of the present invention is to provide a fuel cell and a fuel cell separator capable of improving the efficiency of cooling with a cooling medium.

The point of the present invention resides in reducing the flow of a cooling medium (cooling liquid) to a region not corresponding to the power generation region of an MEA in a cooling medium (cooling liquid) channel in a separator. That is, a peripheral portion of the cooling medium (cooling liquid) channel is formed in correspondence with a peripheral portion of the generation region of the MEA placed adjacent to one surface of the separator.

For example, in a case where a sealing member is placed at a peripheral portion of a cooling medium (cooling liquid) channel, a cooling medium regulating portion for regulating the flow of the cooling medium to the sealing member side is provided inside relative to the sealing portion in the separator surface direction.

To solve the above-described problem, according to the present invention, there is provided a fuel cell including a separator having a cooling medium channel in a cooling medium channel formation surface and a manifold formed therethrough to supply a cooling medium to the cooling medium channel, a stacked member stacked on the cooling medium channel formation surface side of the separator, and a sealing portion interposed between the separator and the stacked member to seal the cooling medium flowing in the cooling medium channel, wherein a cooling medium regulating portion for regulating the flow of the cooling medium supplied from the manifold to the cooling medium channel formation surface toward a manifold-vicinity portion in the sealing portion placed in the vicinity of the manifold is provided between the manifold-vicinity portion and the manifold.

According to this arrangement, flowing round of part of the cooling medium to a region such as the vicinity of the sealing portion where there is no need for cooling, i.e., a region other than the power generation region, is regulated. That is, the cooling medium flowing out of the manifold is introduced into each cooling medium channel while flowing round of the cooling medium to the region where there is no need for cooling is limited.

According to the present invention, there is also provided a fuel cell separator including a cooling medium channel in a cooling medium channel formation surface and a manifold formed therethrough to supply a cooling medium to the cooling medium channel, a sealing portion for sealing the cooling medium supplied from the manifold and flowing in the cooling medium channel being provided on the cooling medium channel formation surface, wherein a cooling medium regulating portion for regulating the flow of the cooling medium supplied from the manifold to the cooling medium channel formation surface toward a manifold-vicinity portion in the sealing portion placed in the vicinity of the manifold is provided between the manifold-vicinity portion and the manifold.

If a fuel cell is constructed by stacking the thus-constructed separator as one stacked member of the fuel cell together with other stacked members, flowing round of part of the cooling medium to a region such as the vicinity of the sealing portion where there is no need for cooling, i.e., a region other than the power generation region, is regulated. That is, the cooling medium flowing out of the manifold is introduced into each cooling medium channel while being restrained from flowing round to the region where there is no need for cooling.

The cooling medium regulating portion may be provided in the vicinity of an inner line of a portion in the sealing portion extending along an opening edge of the manifold.

The cooling medium regulating portion may be formed of a projection provided on the cooling medium channel formation surface side of the separator.

According to this arrangement, the end of the projection is brought into contact with the stacked member facing the projection to stop the cooling medium from flowing round to a place in the vicinity of the sealing over the projection. The projection may be formed integrally with the separator or may be formed separately from the separator and fixed on the separator.

An inner wall of a portion of the cooling medium regulating portion formed of the projection and an inner wall of the manifold may be made flush with each other in the direction of through formation of the manifold.

The cooling medium regulating portion may have a fixed-size structure.

According to this arrangement, the cooling medium regulating portion is not easily deformable like a gasket for example. Therefore the cooling medium regulating portion not only regulates the flow of the cooling medium but also can function as a spacer for stacking the separators with a predetermined spacing.

The cooling medium regulating portion may have electrical conductivity. In such a case, the cooling medium regulating portion may be formed integrally with the separator having electrical conductivity.

The separator may have a second manifold through which the cooling medium flowing in the cooling medium channel is discharged, and a cooling medium regulating portion for regulating the flow of the cooling medium discharged from the cooling medium channel to the second manifold toward a second manifold-vicinity portion in the sealing portion in the sealing portion placed in the vicinity of the second manifold may also be provided between the second manifold-vicinity portion and the second manifold.

The fuel cell of the present invention may be a fuel cell having a separator in which a cooling medium channel is formed, a stacked member stacked on the cooling medium channel formation surface side of the separator, and a sealing portion interposed between the separator and the stacked member to seal a cooling medium flowing in the cooling medium channel, wherein a cooling medium regulating portion for regulating the flow of the cooling medium to the sealing portion side is provided inside relative to the sealing portion in the separator surface direction.

According to this arrangement, flowing round of part of the cooling medium to a region such as the vicinity of the sealing portion where there is no need for cooling, i.e., a region other than the power generation region, is regulated.

The fuel cell separator of the present invention may be a fuel cell separator provided with a cooling medium channel and a sealing portion for sealing a cooling medium flowing in the cooling medium channel, wherein a cooling medium regulating portion for regulating the flow of the cooling medium to the sealing portion side is provided inside relative to the sealing portion in the separator surface direction.

If a fuel cell is constructed by stacking the thus-constructed separator as one stacked member of the fuel cell together with other stacked members, flowing round of part of the cooling medium to a region such as the vicinity of the sealing portion where there is no need for cooling, i.e., a region other than the power generation region, is regulated.

The fuel cell separator of the present invention may be a fuel cell separator in which a cooling medium channel and a manifold for supplying a cooling medium to the cooling medium channel are formed, and in which at least a portion of a cooling medium regulating portion for regulating the flow of the cooling medium is provided along an opening edge of the manifold.

If a fuel cell is constructed by stacking the thus-constructed separator as one stacked member of the fuel cell together with other stacked members, it is possible to introduce the cooling medium into each cooling medium channel while limiting flowing round of the cooling medium from the manifold to a region such as the vicinity of the sealing portion where there is no need for cooling, i.e., a region other than the power generation region.

DETAILED DESCRIPTION

The present invention will be described with respect to one embodiment thereof with reference to FIGS. 1 to 4. The outline of unit cell structure of a fuel cell shown in FIG. 4 will first be described. A unit cell 2 shown in FIG. 4 is constituted by an MEA 11 and a pair of separators 14a and 14b between which the MEA 11 is sandwiched, and has a stacked form as a whole. The MEA 11 and the separators 14a and 14b are sealed with first sealing members 101a and 101b at peripheral portions therebetween as described in detail later.

The MEA 11 is constituted by an electrolyte membrane 21 formed of an ion-exchange membrane made of a polymeric material, and a pair of electrodes 22a and 22b (a cathode and an anode) sandwiching the electrolyte membrane 21 from opposite sides. In the separators 14a and 14b, portions facing the electrodes 22a and 22b are press-molded to form a plurality of projecting ribs 13 in the front and back surfaces. Gas channels 31a for oxidizing gas or gas channels 31b for hydrogen and main cooling water channels (cooling medium channels) 32 are formed between the ribs 13.

More specifically, a plurality of gas channels 31a for oxidizing gas are formed in the inner surface of the separator 14a being the electrode 22a side, while a plurality of main cooling water channels 32 are formed in the outside surface (cooling medium channel formation surface) opposite from the inner surface. Similarly, a plurality of gas channels 31b for hydrogen gas are formed in the inner surface of the separator 14b being the electrode 22b side, while a plurality of main cooling water channels 32 are formed in the outside surface (cooling medium channel formation surface) opposite from the inner surface.

A manifold 41 on the oxidizing gas inlet side, a manifold 42 on the hydrogen gas inlet side and a manifold 43 on the cooling water (medium) inlet side are formed as rectangular openings through one end portion (short-side portion) of each of the separators 14a and 14b. A manifold 51 on the oxidizing gas outlet side, a manifold 52 on the hydrogen gas outlet side and a manifold (second manifold) 53 on the cooling water outlet side are formed as rectangular openings through the other end portion (short-side portion) of each of the separators 14a and 14b.

The first sealing member 101a is constituted by a first main sealing portion 111a in continuous form surrounding all of the passages in the separator 14a relating to oxidizing gas (gas channels 31a and manifolds 41 and 51) on the MEA 11 side, first sub sealing portions 112a and 113a in frame form surrounding on the MEA 11 side the manifolds 42 and 52 of the separator 14a on the hydrogen gas inlet and outlet sides, and first sub sealing portions 114a and 115a in frame form surrounding on the MEA 11 side the manifolds 43 and 53 of the separator 14a on the cooling water inlet and outlet sides. Each of the first sub sealing portions 112a to 115a is separate from the first main sealing portion 111a.

Similarly, the first sealing member 101b is constituted by a first main sealing portion 111b in continuous form surrounding all of the passages in the separator 14b relating to hydrogen gas (gas channels 31b and manifolds 42 and 52) on the MEA 11 side, first sub sealing portions 116b and 117b in frame form surrounding on the MEA 11 side the manifolds 41 and 51 of the separator 14b on the oxidizing gas inlet and outlet sides, and first sub sealing portions 114b and 115b in frame form surrounding on the MEA 11 side the manifolds 43 and 53 of the separator 14b on the cooling water inlet and outlet sides. Each of the first sub sealing portions 114b to 117b is separate from the first main sealing portion 111b.

The unit cell 2 is thus constructed. A plurality of unit cells 2 are stacked one on another, with second sealing members (sealing portions) 101c interposed between the unit cells 2, thus constructing the fuel cell. Each second sealing member 101c has a first main sealing portion 111c in continuous form surrounding all of the passages in the separator 14b (14a) relating to cooling water (main cooling water channels 32, cooling water inflow channels 32a, cooling water outflow channels 32b, and manifolds 43 and 53) on the adjacent unit cell 2 side.

The second sealing member 101c also has first sub sealing portions 112c and 113c for hydrogen gas and first sub sealing portions 116c and 117c for oxidizing gas in a state of being separate from the first main sealing portion 111c, as does each of the first sealing members 101a and 101b.

Figure 1:
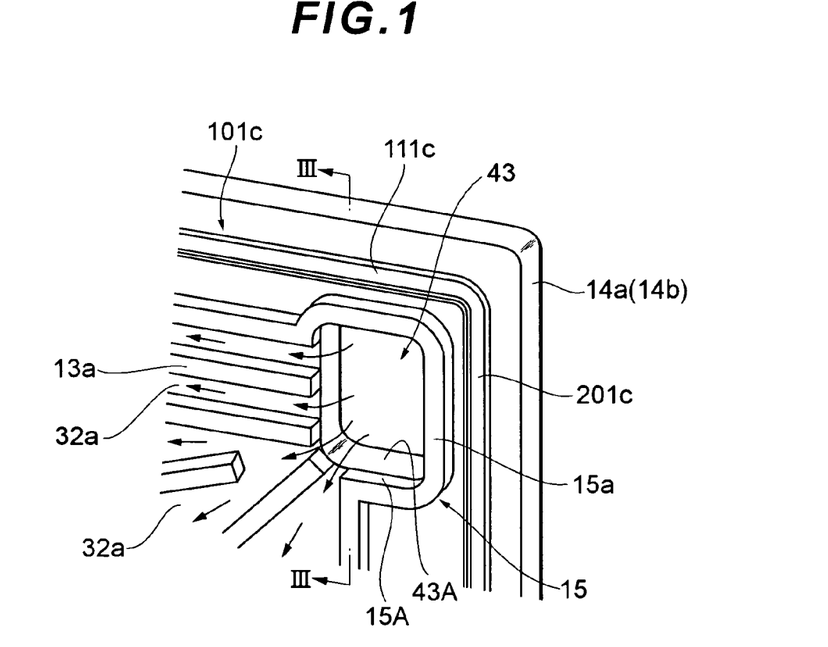
FIG. 1 is a perspective view showing a portion of a fuel cell separator according to one embodiment of the present invention.

FIG. 1 is an enlarged view of the manifold 43 of the separator 14a (14b) shown in FIG. 4 and portions on the periphery of the manifold 43. A plurality of projecting ribs 13a are provided between the manifold 43 and the main cooling water channels 32 outside the area shown in the figure. Cooling water inflow channels 32a through which cooling water is introduced from the manifold 43 into the main cooling water channels 32 are formed between the ribs 13a. Similarly, a plurality of projecting ribs 13 are also provided between the main cooling water channels 32 and the manifold 53, and cooling water outflow channels 32b through which cooling water is flowed out from the main cooling water channels 32 to the manifold 53 are formed between the ribs.

Cooling water supplied to the cooling medium channel formation surface side of the separator 14a (14b) through the manifold 43 is introduced into the main cooling water channels 32 via the cooling water inflow channels 32a, and is discharged to the manifold 53 via the cooling water outflow channels 32b while cooling the power generation region facing the main cooling water channels 32. These cooling water inflow channels 32a and cooling water outflow channels 32b constitute a portion of the cooling medium channels in the present invention, similarly to the cooling water main channel 32 described above.

Figure 2:
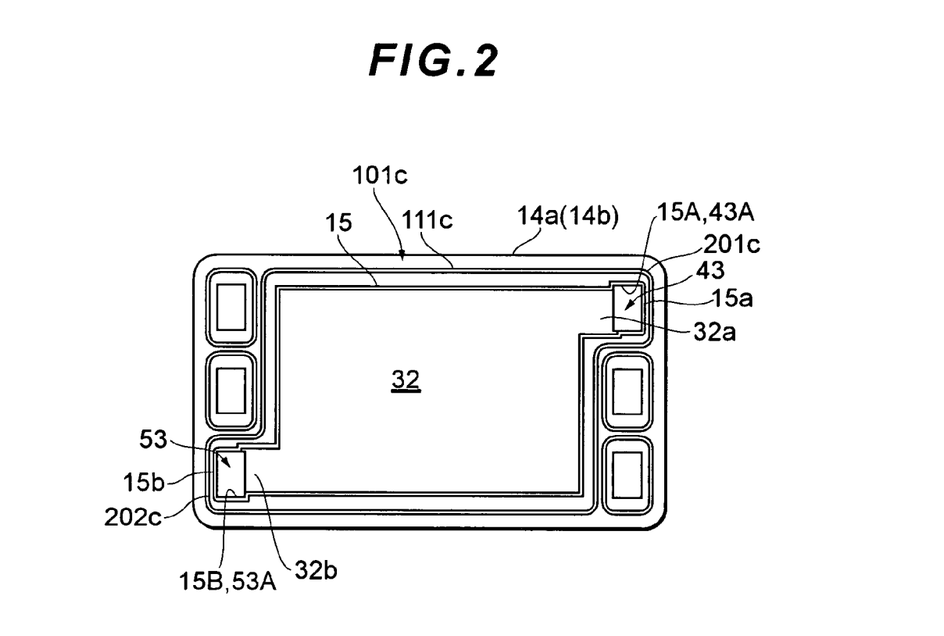
FIG. 2 is a schematic plan view showing the entire fuel cell separator.

On each of the separators 14a and 14b is further provided an outer peripheral rib (cooling medium regulating portion, projection) 15 so as to entirely surround the manifold 43, the cooling water inflow channels 32a, the main cooling water channels 32, the cooling water outflow channels 32b and the manifold 53. The outer peripheral rib 15 is formed of a projection formed on the separator 14a or 14b and having a fixed-size structure in the form of a bank. The outer peripheral rib 15 has, for example, a rectangular cross-sectional shape.

That is, the outer peripheral rib 15 according to the present embodiment includes portions which are located inside the first main sealing portion 111c of the second sealing member 101c for sealing the cooling medium flowing between the separators 14a and 14b, more specifically, portions located between the manifolds 43 and 53 and portions in the first main sealing portion 111c placed in the vicinity of the manifolds 43 and 53 (manifold-vicinity portion 201c and second manifold vicinity portion 202c), and which extend along the opening edges of the manifolds 43 and 53 (and which will be respectively referred to as "outer peripheral rib 15a" and "outer peripheral rib 15b" as occasion demands). Further, in the present embodiment, the outer peripheral rib 15 is provided so as to surround the generation region including the formations regions for the cooling water inflow channels 32a, the main cooling water channels 32 and the cooling water outflow channels 32b, and the manifolds 43 and 53 through which cooling water is supplied and discharged.

The outer peripheral ribs 15a and 15b are provided so that their inner walls 15A and 15B and inner walls 43A and 53A of the manifolds 43 and 53 are flush or substantially flush with each other in the direction of through formation of the manifolds 43 and 53 (in the thickness direction of the separator 14a/14b).

As a result, no space is formed between the opening edges of the manifolds 43 and 53 defined by the opening ends of the inner walls 43A and 53A and the inner walls 15A and 15B of the outer peripheral ribs 15a and 15b as a space allowing cooling water introduced from the manifold 43 into the main cooling water channels 32 to flow round to the manifold-vicinity portion 201c side of the first main sealing portion 111c, i.e., a redundant space. Also, no space (redundant space) is formed as a space allowing cooling water flowed out from the main cooling water channels 32 to the manifold 53 to flow around to the second manifold-vicinity portion 202c side of the first main sealing portion 111c.

Preferably, the outer peripheral rib 15 is made electrically conductive to limit the reduction in power generation efficiency. For example, the separators 14a and 14b are formed of carbon or a metal and the outer peripheral ribs 15 are formed integrally with the separators 14a and 14b, thus making the outer peripheral ribs 15 electrically conductive. With this arrangement, the number of component parts and the number of assembly steps can be reduced in comparison with a case where outer peripheral ribs 15 provided separately from the separators 14a and 14b are fixed on the separators 14a and 14b later.

Figure 3:
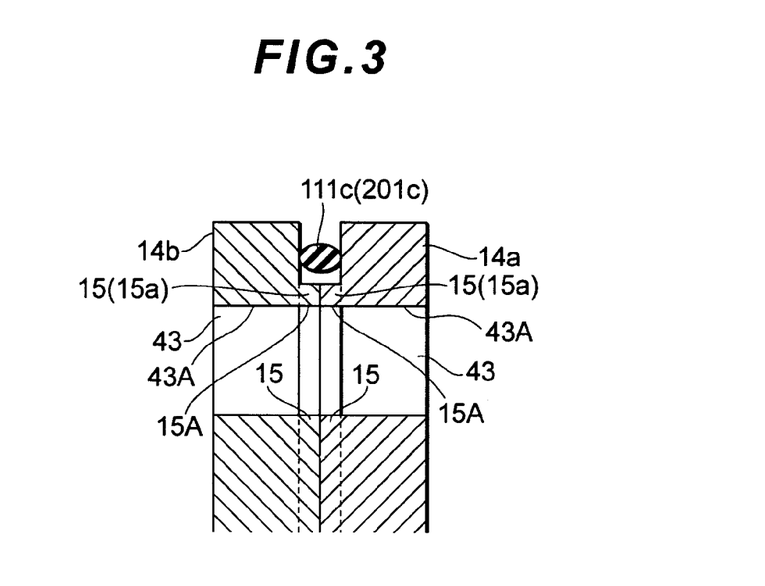
FIG. 3 is a sectional view taken along line III-III in FIG. 1.
Figure 4:
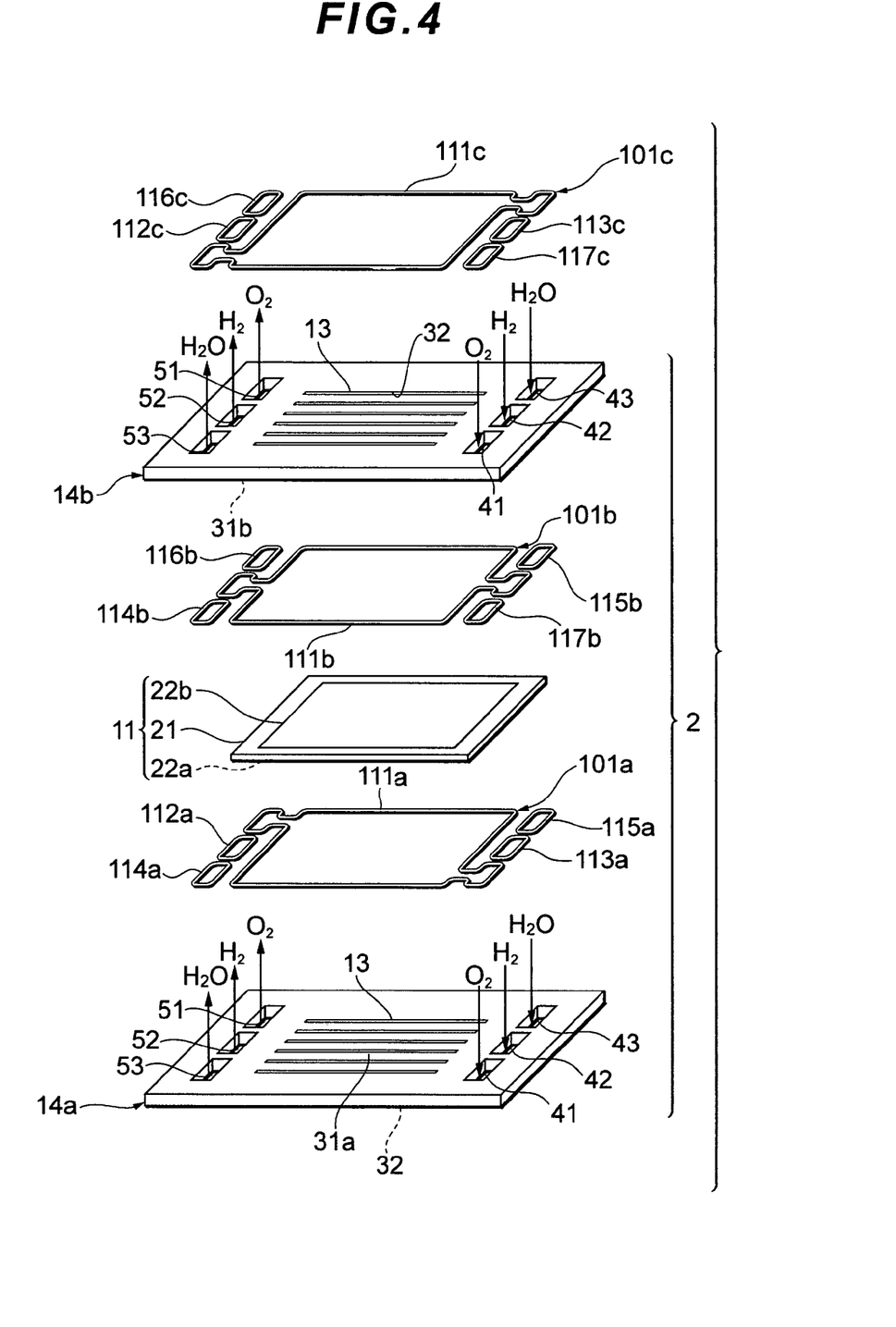
FIG. 4 is an exploded perspective view showing a unit cell structure of a fuel cell according to one embodiment of the present invention.

The separator 14a for one of each adjacent pair of unit cells 2 and the separator (stacked member) 14b for the other unit cell 2 are stacked in such a state that the ends of the outer peripheral ribs 15 abut against each other, as shown in FIG. 3. At this time, the first main sealing portion 111c of the second sealing member 101c is interposed between the two separators 14a and 14b to seal in a liquid-tight manner cooling water flowing through the manifold 43, the cooling water inflow channels 32a, the main cooling water channels 32 and the cooling water outflow channels 32b in this order and discharged from the manifold 53.

The outer peripheral ribs 15 in the present embodiment are formed integrally with the separators 14a and 14b and has a fixed-size structure such as not to be easily deformable like all of the other sealing members including the second sealing member 101c under a compression load (fastening load) in the cell stacking direction. Therefore, the outer peripheral rib 15 also functions as a spacer for stacking the separators 14a and 14b with a predetermined spacing.

During power generation of the fuel cell thus-constructed, cooling water supplied from the manifold 43 flows into the main cooling water channels 32 through the cooling water inflow channels 32a while being guided (regulated) by a portion (outer peripheral rib 15a) of the outer peripheral rib 15 so that a flow to the inner line side of the manifold-vicinity portion 201c in the first main sealing portion 111c is stopped. This cooling water flows through the cooling water outflow channels 32b to be discharged to the outlet-side manifold 53 while cooling the power generation region.

According to the present embodiment, as described above, the flow of cooling water flowing out of the manifold 43 to spread in the separator surface direction is guided to the power generation region side by the outer peripheral rib 15. Cooling water is thereby stopped from flowing round to a region between the manifold 43 and the second sealing member 101c, i.e., a non-power generation region other than the power generation region, thus limiting the generation of a flow of cooling water along the second sealing member 101c such as indicated by arrow B in FIG. 7, and making it possible to improve the efficiency of cooling of the fuel cell with cooling water.

In particular, as a result of the provision of a portion (outer peripheral rib 15a) of the outer peripheral rib 15 between the manifold 43 and the manifold-vicinity portion 201c of the first main sealing portion 111c placed in the vicinity of the manifold 43, no space (redundant space) allowing cooling water introduced from the manifold 43 into the main cooling water channels 32 to flow round to the manifold-vicinity portion 201c side is provided between the opening edge of the manifold 43 and the inner wall 15A of the outer peripheral rib 15a, and it is, therefore, possible to introduce into the main cooling water channels 32 the cooling water supplied from the manifold 43 to the separator surface while effectively limiting flowing round of the cooling water from the manifold 43 to the region where there is no need for cooling.

Also, as a result of the provision of a portion (outer peripheral rib 15b) of the outer peripheral rib 15 between the manifold 53 and the manifold-vicinity portion 202c of the first main sealing portion 111c placed in the vicinity of the manifold 53, no space (redundant space) allowing cooling water flowed out from the main cooling water channels 32 to the manifold 53 to flow round to the second manifold-vicinity portion 202c side is provided between the opening edge of the manifold 53 and the inner wall 15B of the outer peripheral rib 15b, and, therefore, the cooling water flowed out of the cooling water outflow channels 32b is discharged to the manifold 53 without detouring while being guided by the outer peripheral rib 15 (outer peripheral rib 15b in particular).

<Other Embodiments>

While in the above-described embodiment the outer peripheral rib 15 is provided so as to entirely surround the manifold 43, the cooling water inflow channels 32a, the main cooling water channels 32, the cooling water outflow channels 32b and the manifold 53, the arrangement may be such that at least a portion of the outer peripheral rib 15 is provided along the portions of the opening edges of the manifolds 43 and 53 facing the separator outer peripheral side.

Also, the outer peripheral rib 15 may be provided on at least one of the separators 14a and 14b facing each other. Further, while the outer peripheral ribs 15 may be formed integrally with the separators 14a and 14b as described above, the arrangement may alternatively be such that the outer peripheral ribs 15 are formed separately from the separators 14a and 14b and are fixed on the separators 14a and 14b.

Also, the sealing portion interposed between each separator and the stacked member stacked on the cooling medium channel formation side of the separator to seal the cooling medium flowing in the cooling medium channels is not limited to a gasket such as the second sealing member 101c according to the embodiment described above; it may be an adhesive.

According to the present invention, because the cooling medium regulating portion is provided inside relative to the sealing portion, the cooling medium flowing round to the region where there is no need for cooling regulated, thereby improving the efficiency of cooling of the fuel cell.

The present invention can therefore be widely used in fuel-cell batteries and fuel cell separators with such a need.

We claim:

1. A fuel cell comprising a separator having a cooling medium channel in a cooling medium channel formation surface and a manifold formed therethrough to supply a cooling medium to the cooling medium channel, a stacked member stacked on the cooling medium channel formation surface side of the separator, and a sealing portion interposed between the separator and the stacked member to seal the cooling medium flowing in the cooling medium channel,
wherein a cooling medium regulating portion for regulating the flow of the cooling medium supplied from the manifold to the cooling medium channel formation surface toward a manifold-vicinity portion in the sealing portion placed in the vicinity of the manifold is provided between the manifold-vicinity portion and the manifold,
wherein the sealing portion is provided on a peripheral portion of the separator and on a surface which is the same as the cooling medium channel formation surface, the sealing portion being a seal member in continuous form surrounding only the cooling medium channel and the manifold,
wherein the cooling medium regulating portion is formed of a projection provided on the cooling medium channel formation surface side of the separator and inside the continuous sealing portion,
wherein the projection is formed of a rib having a fixed-size structure,
wherein the sealing portion is outside and along the rib,
wherein the cooling medium regulating portion has a height greater than a height of a peripheral portion of the separator and a height of a central portion of the separator,
wherein the cooling medium regulating portion isolates the peripheral portion of the separator from the central portion of the separator, and
wherein the cooling medium regulating portion is a spacer for stacking the separator with a predetermined spacing.

2. The fuel cell according to claim 1,
wherein the cooling medium regulating portion is provided in the vicinity of an inner line of a portion in the sealing portion extending along an opening edge of the manifold.

3. The fuel cell according to claim 1,
wherein a portion of the cooling medium regulating portion and an inner wall of the manifold are flush with each other in the direction of through formation of the manifold.

4. The fuel cell according to claim 1,
wherein the cooling medium regulating portion has a structure such as not to be easily deformed under a compression load compared to the sealing portion.

5. The fuel cell according to claim 1,
wherein the cooling medium regulating portion has electrical conductivity.

6. The fuel cell according to claim 1,
wherein the cooling medium regulating portion is formed integrally with the separator having electrical conductivity.

7. The fuel cell according to claim 1,
wherein the separator has a second manifold through which the cooling medium flowing in the cooling medium channel is discharged, and
wherein a cooling medium regulating portion for regulating the flow of the cooling medium discharged from the cooling medium channel to the second manifold toward a second manifold-vicinity portion in the sealing portion in the sealing portion placed in the vicinity of the second manifold is provided between the second manifold-vicinity portion and the second manifold while leaving a portion flush with an opening surface of the second manifold, a portion of the cooling medium regulating portion and an inner wall of the second manifold being flush with each other in the direction of through formation of the second manifold.

8. A fuel cell separator comprising a cooling medium channel in a cooling medium channel formation surface and a manifold formed therethrough to supply a cooling medium to the cooling medium channel, a sealing portion for sealing the cooling medium supplied from the manifold and flowing in the cooling medium channel being provided on the cooling medium channel formation surface,
wherein a cooling medium regulating portion for regulating the flow of the cooling medium supplied from the manifold to the cooling medium channel formation surface toward a manifold-vicinity portion in the sealing portion placed in the vicinity of the manifold is provided between the manifold-vicinity portion and the manifold,
wherein the sealing portion is provided on a peripheral portion of the separator and on a surface which is the same as the cooling medium channel formation surface, the sealing portion being a seal member in continuous form surrounding only the cooling medium channel and the manifold,
wherein the cooling medium regulating portion is formed of a projection provided on the cooling medium channel formation surface side of the separator and inside the continuous sealing portion,
wherein the projection is formed of a rib having a fixed-size structure,
wherein the sealing portion is outside and along the rib,
wherein the cooling medium regulating portion has a height greater than a height of a peripheral portion of the separator and a height of a central portion of the separator,
wherein the cooling medium regulating portion isolates the peripheral portion of the separator from the central portion of the separator, and
wherein the cooling medium regulating portion is a spacer for stacking the separator with a predetermined spacing.

9. The fuel cell separator according to claim 8,
wherein the cooling medium regulating portion is provided in the vicinity of an inner line of a portion in the sealing portion extending along an opening edge of the manifold.

10. The fuel cell separator according to claim 8,
wherein a portion of the cooling medium regulating portion and an inner wall of the manifold are flush with each other in the direction of through formation of the manifold.

11. The fuel cell separator according to claim 8,
wherein the cooling medium regulating portion has a structure such as not to be easily deformed under a compression load compared to the sealing portion.

12. The fuel cell separator according to claim 8,
wherein the cooling medium regulating portion has electrical conductivity.

13. The fuel cell separator according to claim 8,
wherein the cooling medium regulating portion is formed integrally with the separator having electrical conductivity.

14. The fuel cell separator according to claim 8,
wherein the separator has a second manifold through which the cooling medium flowing in the cooling medium channel is discharged, and
wherein a cooling medium regulating portion for regulating the flow of the cooling medium discharged from the cooling medium channel to the second manifold toward a second manifold-vicinity portion in the sealing portion placed in the vicinity of the second manifold is also provided between the second manifold-vicinity portion and the second manifold while leaving a portion flush with an opening surface of the second manifold, a portion of the cooling medium regulating portion and an inner wall of the second manifold being flush with each other in the direction of through formation of the second manifold.

15. The fuel cell according to claim 1, wherein said manifold-vicinity portion is located between said manifold and said sealing portion, and
wherein said cooling medium regulating portion formed of a projection projects relative to said manifold-vicinity portion, thus blocking the flow of fluid from said manifold to said manifold-vicinity portion.

16. The fuel cell separator according to claim 8, wherein said manifold-vicinity portion is located between said manifold and said sealing portion, and
wherein said cooling medium regulating portion formed of a projection projects relative to said manifold-vicinity portion, thus blocking the flow of fluid from said manifold to said manifold-vicinity portion.

* * * * *